Oct. 26, 1965    P. J. LONG, JR    3,213,972

SHOCK ABSORBER

Filed Sept. 25, 1963

INVENTOR.
Paul J. Long, Jr.
BY
J.C. Evans
His Attorney

United States Patent Office 3,213,972
Patented Oct. 26, 1965

3,213,972
SHOCK ABSORBER
Paul J. Long, Jr., Dayton, Ohio, assignor to General Motors Corporation, Detroit, Mich., a corporation of Delaware
Filed Sept. 25, 1963, Ser. No. 311,370
1 Claim. (Cl. 188—88)

This invention relates to hydraulic shock absorbers and more particularly to double, direct-acting type shock absorbers and fluid flow control arrangements therein.

The shock absorber of the present invention includes a rebound cutoff control arrangement representing an improvement of the rebound cutoff type of shock absorber set forth in the copending application to Karlgaard, Serial No. 245,214, filed December 17, 1962, which discloses a rebound cutoff arrangement for use in an economical, double, direct-acting type shock absorber that lends itself to mass production. While the Karlgaard shock absorber is suited for many applications, it has been found that the particular cutoff arrangement therein produces noises that are objectionable in certain applications.

Accordingly, an object of the present invention is to improve a double, direct-acting shock absorber having a rebound cutoff arrangement comprising a single duct connecting two pressure chambers in the shock absorber through a rod guide portion thereof that controls fluid flow on rebound in cooperation with a rod guide element by the provision of means for reducing relatively high pressure buildups within the shock absorber upon initial compression displacement of its piston from a full rebound position where such pressure buildups might tend to produce shock absorber noise problems.

A further object of the present invention is to provide an economical rebound cutoff arrangement in a double acting type shock absorber including a single duct through a piston rod assembly that cooperates with a rod guide element to prevent fluid flow between compression and rebound chambers during one phase of operation and a valve means for allowing fluid flow between such chambers during another phase of operation wherein fluid flow through the duct would otherwise be blocked by the rod guide element.

Further objects and advantages of the present invention will be apparent from the following description, reference being had to the accompanying drawings wherein a preferred embodiment of the present invention is clearly shown.

Figure 1:
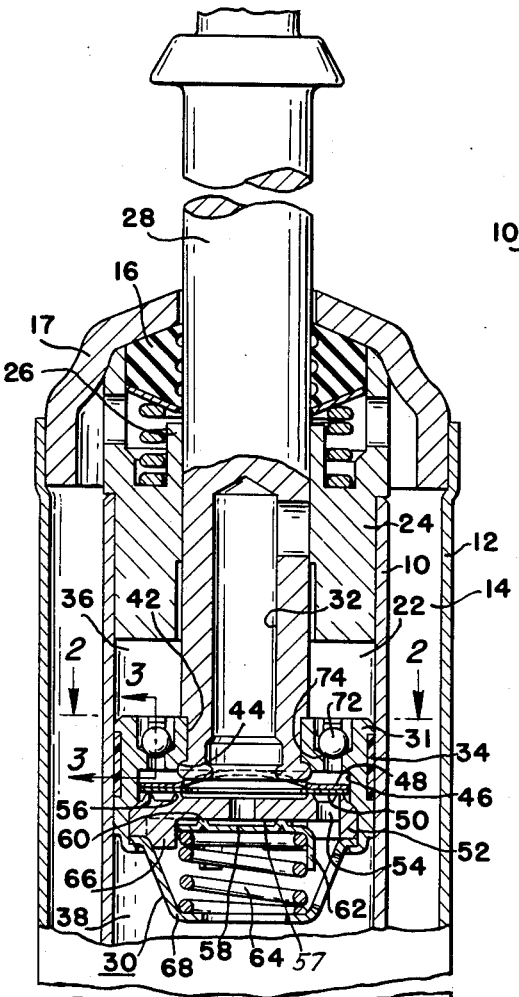
FIGURE 1 is a view partially in elevation and partially in section of a double, direct-acting shock absorber including the fluid flow control mechanism of the present invention.
Figure 2:
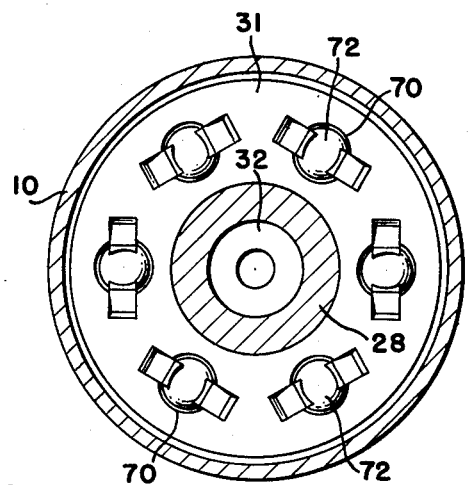
FIGURE 2 is a view in horizontal section taken along line 2—2 of FIGURE 1.
Figure 3:
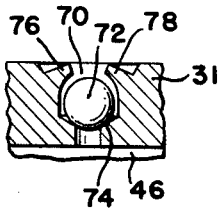
FIGURE 3 is a view in vertical section taken along the line 3—3 of FIGURE 1.

Specifically referring to the drawings, a shock absorber 8 is provided which includes a cylinder 10 that is enclosed by an outer tube 12 which forms an oil reservoir chamber 14 therearound. The reservoir chamber 14 is sealed at its upper end by means of a seal 16 held in place by a closure member 17. The lower end of the oil reservoir chamber 14 is sealed by a lower closure member 18 which includes a duct or ducts 19 therein. The inner cylinder 10 is sealed from the oil reservoir chamber 14 by means of a compression valve assembly 20 which includes suitable valving for controlling hydraulic fluid flow through the duct 19 from the chamber 14 into a chamber 22 within cylinder 10. The upper end of the chamber 22 is defined by a rod guide 24 which is sealed to the cylinder 10 and which acts as a seat for a spring 26 which compresses the seal 16. The seal 16 operates against a rod 28 which is guided by the rod guide 24. The rod 28 carries at its lower end a valve assembly 30 and is drilled centrally thereof as at 32 to form a duct which exhausts into the chamber 22 through the valve assembly 30 carried by a piston 31 attached to the lower end of the rod 28. The piston 31 is made of steel or other suitable material and may include a nylon piston ring 34 therearound which engages the inner surface of cylinder 10 in slidable relation thereto.

The duct 32 in the piston rod extends a substantial distance into the chamber 22 within the cylinder 10 and the rod guide 24 is elongated so that when the piston rod 28 moves exteriorly of the shock absorber 8 upon a rebound stroke, the duct 32 is throttled or closed by the elongated rod guide 24 whereby the action of the shock absorber during the final rebound movement is highly damped to eliminate the need for rubber bumpers or the like previously required in conjunction with front shock absorbers used on certain types of motor cars and the like for controlling movements between their sprung and unsprung masses.

The nylon piston ring 34 is made and applied in accordance with the teachings set forth in the copending application of Karlgaard, Serial No. 829,595, filed July 27, 1959, which shows such a piston ring in connection with a conventional type of piston in a double-acting shock absorber. The piston 31 and valve assembly 30 separate the chamber 22 into an upper or rebound chamber 36 and a lower or compression chamber 38.

The shock absorber 8 is attached at one end by means of a fitting 40 to one part of the vehicle while the rod 28 is attached to the other part of the vehicle whereby the shock absorber acts between the sprung and unsprung mass of the vehicle in a conventional manner. As the shock absorber is activated due to relative movement between the sprung and unsprung masses, fluid is caused to flow from the lower chamber to the upper chamber or vice versa through the valve assembly 30 in accordance with the direction of movement of the several masses.

Specifically referring to the piston 31 and its attachment to the piston rod $28_1$ it will be noted that the piston is fitted onto the undercut portion of the rod as at 42 and the rod is then hot upset as at 44 to permanently attach the piston thereto. The piston is undercut to form a centrally located cavity 46 therein into which the valve assembly 30 is fitted. This valve assembly 30 makes up a major part of the invention here and comprises a number of parts, specifically, an annular spring member 48, an annular valve disc 50, a centrally apertured valve plate 52 which includes a plurality of spaced apertures 54 around the periphery thereof which have a pair of annular seats 56 at opposite sides thereof that engage the valve disc and are normally closed thereby against fluid from the upper cylinder chamber. The surface 57 opposed to the annular seats 56 on the apertured valve plate 52 is machine smooth and acts as a seating surface for a stamped valve cup 58. The valve cup 58 has an annular raised portion 60 therearound which seats against the surface of the valve plate 52 and seals the central aperture thereof. The valve cup 58 includes three spaced fingers or ears 62 extending outwardly therefrom and away from the annular raised portion thereon. These fingers 62 act as a guide for a spring 64. The outer periphery of the fingers are guided with respect to the central aperture of the valve plate 52 by raised portions 66 preferably three in number and spaced equally around the valve plate 52 and between the spaced apertures 54 therethrough. These raised portions 66 guide the fingers 62 and the valve cup 58 and provide some friction against opening of the valve 58 against the spring. The entire assembly is held within the piston by an apertured cap 68 which is swedged into the piston after the assembled parts are positioned therein to permanently associate the several parts of the valve 30 and to provide a compressive force against the spring member 48 and the spring 64.

In operation, as the piston rod 28 is forced downwardly, fluid from the lower chamber 38 flows through the apertures 54 in the valve plate 52 and causes the annular valve disc 50 to open against the resistance of spring member 48 and permit fluid to pass through the apertures 54 into the duct 32 and thence into upper chamber 36. When the piston rod 28 is moving in the opposite direction on the rebound stroke the valve disc 50 is maintained closed and fluid passing into the duct 32 causes the annular raised portion 60 on the valve cup 58 to compress the spring 64 and permit fluid to flow through the central aperture in the valve plate 52. Thus, operation of the shock absorber utilizes the two valve mechanisms which are maintained in concentric relation within the piston. Other portions of the shock absorber operate in a conventional manner. The above-described shock absorber arrangement offers a simplified valve structure for controlling fluid flow in double, direct-acting type shock absorbers and the above-described valve assembly 30 has been found to be unusually quiet in operation during normal shock absorber operation. These aspects of the illustrated shock absorber are set forth in more particularity in the copending Karlgaard application Serial No. 245,214.

When the shock absorber is in a full rebound condition, the duct 32 for communicating the upper and lower compartments 36, 38 in cylinder 10 is completely cut off by the elongated rod guide element 24. In this case, when the piston 31 moves into the lower compartment or compression chamber 38 upon movement of a sprung and unsprung mass apart from one another, the full piston displacement is transferred through the base valve 20 to effectively create a void between the piston 31 and the guide 24 that is not filled until the cross hole portion of duct 32 travels out of the rod guide 24. The presence of such a void produces a relatively high load within the shock absorber for a short period of time that results in a relatively substantial noise emanating from the shock absorber during the initial compression stroke that becomes objectionable in some environments where the shock absorber is, for example, located adjacent to the passenger compartment of a vehicle.

Therefore, in accordance with certain of the principles of the present invention, the piston 31 includes a plurality of circumferentially located openings 70 therethrough that communicate the upper compartment 36 within cylinder 10 with the centrally located cavity 46 above the annular valve disc 50 blocking flow through apertures 54. Within each of the passageways 70 is located a ball check element 72 held by gravity against a seat 74 formed interiorly of the piston 31 around each of the passageways 70 to block fluid flow through passageway 70 during the rebound stroke whereby all fluid flow between compartments 38 and 36 is directed through the unitary duct 32. Each of the ball check elements 72 is held within the passageway 70 for limited relative movement between the seat 74 and the upper end of piston 31 by fingers 76, 78 formed integrally with the remainder of the piston 31 to overlie opening 70 to prevent movement of the ball 72 exteriorly of the piston 31.

By virtue of the ball check elements 72, when the piston 31 moves into the lower chamber 38 upon the initial phase of the compression stroke, during which time the cross passage portion of duct 32 is completely blocked by rod guide 24, the ball elements 72 are displaced upwardly of their respective seats 74 to allow substantially free fluid flow between the cavity 46 and upper rebound compartment or chamber 36 under the control of the annular valve disc 50 whereby any tendency for a void to be created within chamber 36 is effectively eliminated by the entrance of fluid therein. Accordingly, the movement of the illustrated economical, unitary piston and piston rod assembly having two valves located concentrically thereof for producing desired shock absorbing characteristics occurs smoothly and without any objectionable noises.

By virtue of the improved rebound cutoff arrangement of the present invention, the simplified valve structure that enables a conventional type shock absorber to be readily modified to a relatively simple form of rebound cutoff is adapted for association with systems where objectionable noises would otherwise have made the economical shock absorber undesirable. Moreover, by virtue of the present invention, all of the advantages of the Karlgaard double, direct-acting shock absorber with simplified rebound cutoff are retained by merely modifying the piston element thereof to include an economical valve assembly to overcome the noise problem.

While the embodiment of the present invention as herein disclosed constitutes a preferred form, it is to be understood that other forms might be adopted.

What is claimed is as follows:

In a direct double-acting hydraulic shock absorber, the combination of, means forming a chamber, a piston mounted within said chamber for dividing said chamber into variable capacity compartments, a piston rod having one end thereof directly connected to said piston through a central opening therein, said piston rod having a concentric bore therein and a side opening therein communicating said concentric bore with one of said compartments, first passageway means in said piston, said concentric bore being in serial communication with said first piston passageway for hydraulically communicating said two compartments, said piston being formed in a cup-shape having the base thereof connected to said piston rod and its opened end communicating with one of said compartments, a valve assembly located within said piston including a valve plate having valve seat faces on opposite sides thereof, an annular disc valve element aligned with one of said seat valve faces, a cup-shaped valve element seated against the valve seat face on the opposite side of said valve plate, spring means for maintaining said valve disc and cup-shaped valve normally closed against said valve seat faces, said spring mean being responsive to opposite movement of said piston within said chamber to effect a predetermined movement of said valve element to control flow through said first piston passageway and said piston rod passageway and opening, a rod guide element located within said other of said compartments cooperating with said piston rod opening for blocking fluid flow therethrough following a predetermined movement of said piston in a first predetermined direction for increasing shock absorber damping in excess of that producted by said cup-shaped valve, a second passageway in said piston through its base for by-passing said rod passageway and opening, and valve means located within said second passageway operable upon movement of said piston opposite to said first predetermined movement to direct fluid from said one compartment into said other compartment whereby fluid locking of said piston rod following said predetermined movement is eliminated.

(References on following page)

References Cited by the Examiner

UNITED STATES PATENTS

| | | | |
|---|---|---|---|
| 1,013,384 | 1/12 | Flentze | 188—88 |
| 1,576,286 | 3/26 | Lang | 188—88 |
| 2,702,099 | 2/55 | Lautz | 188—88 |
| 2,760,604 | 8/56 | Wyeth | 188—88 |
| 2,907,414 | 10/59 | Patriquin | 188—88 |
| 2,924,304 | 2/60 | Patriquin | 188—88 |
| 3,057,441 | 10/62 | Pribonu et al. | 188—88 |

FOREIGN PATENTS

| | | |
|---|---|---|
| 5,120 | 10/05 | France. |
| 491,129 | 2/54 | Italy. |
| 934,671 | 11/55 | Germany. |

ARTHUR L. LA POINT, *Primary Examiner.*

EUGENE G. BOTZ, *Examiner.*